(12) United States Patent
Herfurth et al.

(10) Patent No.: US 12,394,770 B2
(45) Date of Patent: Aug. 19, 2025

(54) SEMICONDUCTOR DEVICE WITH BACK SIDE PROTECTION MECHANISM

(71) Applicants: IHP GmbH-Innovations for High Performance Microelectronics/Leibniz-Instit. für innovative Mikroelektronik, Frankfurt (DE); TECHNISCHE UNIVERSITÄT BERLIN, Berlin (DE)

(72) Inventors: Norbert Herfurth, Frankfurt (DE); Marco Lisker, Frankfurt (DE); Elham Amini, Berlin (DE); Christian Boit, Berlin (DE); Jean-Pierre Seifert, Werder (DE)

(73) Assignees: IHP GmbH-Innovations for High Performance Microelectronics/Leibniz-Instit. für innovativeIHP GmbH-Innovations for High Performance Microelectronics/Leibniz-Instit. für innovative, Frankfurt (DE); TECHNISCHE UNIVERSITÄT BERLIN, Berlin (DE)

( * ) Notice: Subject to any disclaimer, the term of this patent is extended or adjusted under 35 U.S.C. 154(b) by 0 days.

(21) Appl. No.: 18/559,076

(22) PCT Filed: Apr. 29, 2022

(86) PCT No.: PCT/EP2022/061452
§ 371 (c)(1),
(2) Date: Nov. 6, 2023

(87) PCT Pub. No.: WO2022/233720
PCT Pub. Date: Nov. 10, 2022

(65) Prior Publication Data
US 2024/0379583 A1    Nov. 14, 2024

(30) Foreign Application Priority Data

May 6, 2021 (EP) .................................... 21172601
Jul. 29, 2021 (EP) .................................... 21188545

(51) Int. Cl.
*H01L 25/16* (2023.01)
*G06F 21/87* (2013.01)
(Continued)

(52) U.S. Cl.
CPC ............ *H01L 25/167* (2013.01); *G06F 21/87* (2013.01); *H01L 23/573* (2013.01); *H10F 55/25* (2025.01);
(Continued)

(58) Field of Classification Search
CPC ..... H01L 23/573; H01L 25/167; H01L 33/22; H01L 33/62; H01L 2933/0091;
(Continued)

(56) References Cited

U.S. PATENT DOCUMENTS 4,534,804 A    8/1985  Cade
4,667,212 A *  5/1987  Nakamura ............ H01L 27/156
                                                      257/E27.128
(Continued)

OTHER PUBLICATIONS

Extended European Search Report for Europe Patent Application No. 21188545.4, dated Jan. 24, 2022, 9 pages.

*Primary Examiner* — Jennifer D Bennett
(74) *Attorney, Agent, or Firm* — Sheridan Ross PC

(57) ABSTRACT

A semiconductor device, a method of operating the semiconductor device, and a method of fabricating the semiconductor device are disclosed. The semiconductor device comprises a substrate stack comprising two permanently bonded semiconductor bodies stacked in a depth direction that points perpendicularly from a front side towards a back side of the substrate stack, and which share a buried bonding (Continued)

Figure 1:
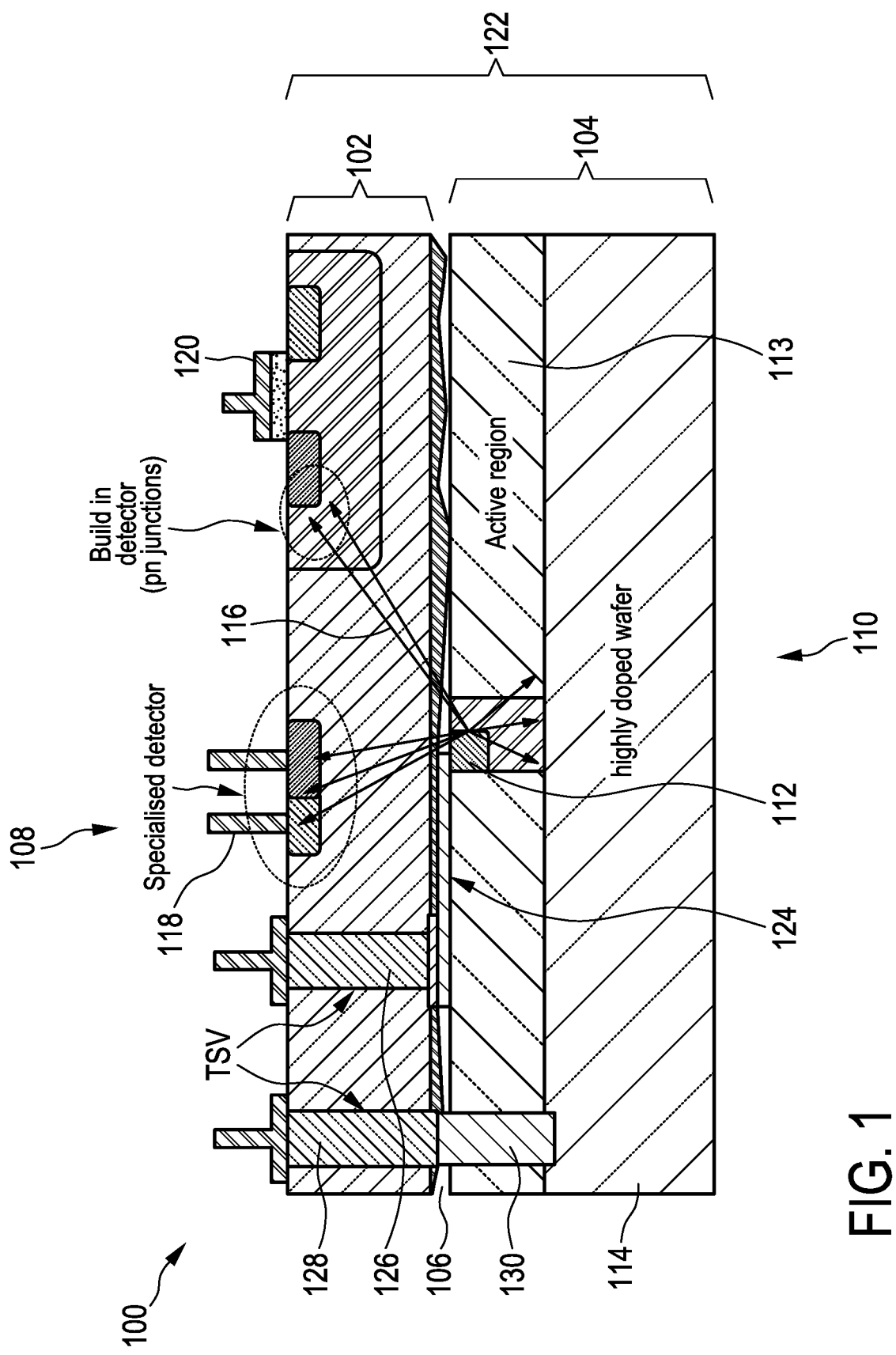

interface. One of the semiconductor bodies, the protection body, comprises an active region with a light emitter at the buried bonding interface, and a light absorption region which is opaque for light emitted from the light emitter. Another of the semiconductor bodies, the circuit body, extends from the buried bonding interface to the front side, is transmissive for the light emitted from the light emitter, and comprises a light detector at the front side to provide a detector signal indicative of a detected light intensity of light emitted from the light emitter and transmitted through the circuit body. A driver unit of the semiconductor device is configured to drive operation of the light emitters using predetermined operation parameters.

15 Claims, 3 Drawing Sheets

(51) Int. Cl.
*H01L 23/00* (2006.01)
*H10F 55/25* (2025.01)
*H10H 20/01* (2025.01)
*H10H 20/80* (2025.01)
*H10H 20/82* (2025.01)
*H10H 20/857* (2025.01)

(52) U.S. Cl.
CPC ........... *H10H 20/018* (2025.01); *H10H 20/82* (2025.01); *H10H 20/857* (2025.01); *H10H 20/882* (2025.01)

(58) Field of Classification Search
CPC ....... G06F 21/86; G06F 21/87; G06K 19/073; H10F 55/25; H10H 20/018; H10H 20/82; H10H 20/857; H10H 20/882
See application file for complete search history.

(56) References Cited

U.S. PATENT DOCUMENTS

| | | |
|---|---|---|
| 5,357,122 A * | 10/1994 | Okubora ................. H01L 23/48 257/E27.128 |
| 9,741,671 B1 | 8/2017 | Trester et al. |
| 10,521,897 B2 | 12/2019 | Bahgat Shehata et al. |
| 2012/0320477 A1 | 12/2012 | Lisart et al. |
| 2013/0314121 A1 | 11/2013 | Mougin et al. |
| 2017/0186706 A1 | 6/2017 | Guilley et al. |
| 2017/0279532 A1 * | 9/2017 | Bartley ................. H04B 10/80 |
| 2018/0340850 A1 * | 11/2018 | Campbell .............. G01N 21/76 |
| 2019/0148313 A1 | 5/2019 | Jullian et al. |
| 2021/0335917 A1 * | 10/2021 | Wang .................... H10K 71/00 |

* cited by examiner

SEMICONDUCTOR DEVICE WITH BACK SIDE PROTECTION MECHANISM

CROSS REFERENCE TO RELATED APPLICATIONS

This application is a national stage application under 35 U.S.C. 371 and claims the benefit of PCT Application No. PCT/EP2022/061452 having an international filing date of 29 Apr. 2022, which designated the United States, and which PCT application claimed the benefit of European Patent Application No. 21172601.3 filed 6 May 2021, and European Patent Application No. 21188545.4 filed 29 Jul. 2021, the contents of each of which are incorporated herein by reference in their entireties.

The invention relates to a semiconductor device. It is concerned with protecting the semiconductor device against physical and optical attacks. The invention further relates to a method of operating a semiconductor device and to a method of fabricating a semiconductor device.

U.S. Pat. No. 7,005,733 B2 describes an integrated circuit device comprising a circuit, which uses encryption, and an encapsulation packaging layer. The circuit is responsive to at least one physical parameter of the encapsulation to apply the encryption and/or decryption by reading the key therefrom, so that tampering with the encapsulation to gain access to the circuit causes the encryption and/or decryption to fail. In this structure, a light source is positioned on the surface of the IC and several sensors on the IC are used to detect the reflected light. However, the application range of the IC is restricted as the IC must be surrounded by a transparent encapsulation structure, which in turn is enclosed by a reflective outer covering. Due to this particular form or encapsulation, heat cannot leave the package, thus forming a risk of exposing the IC to excess heat and resulting damage.

In addition, the back side of an integrated circuit (IC) chip is vulnerable against side-channel attacks and often used to get access to information which is stored within the IC. Different approaches to protecting the chip back side have been developed, e.g., using opaque coating layers, depositing metal grids, and implanting highly doped layers.

A tamper protection of the back side of a semiconductor device is disclosed in U.S. Pat. No. 8,198,641 B2. A plurality of electronic circuits is formed on a circuitry side of a substrate having an opposite side, which is a back side of the semiconductor device. The semiconductor device comprises at least one light-emitting device and at least one light-sensing device provided on the circuitry side of the semiconductor device. The light emitting device is arranged to emit light, including a wavelength range for which the substrate is transparent, into the substrate towards the back side, and the light sensing device is arranged to sense at least a fraction of the emitted light following passage through the substrate and reflection at the back side, and configured to output a signal indicative of a reflecting state of the back side, thereby enabling detection of an attempt to tamper with the back side of the semiconductor device. The disclosed solution is incapable of protecting the IC against attacks using optical techniques, which are not harmful to the back side surface.

It is an object of the invention to provide a semiconductor device having an improved back side protection.

According to the invention, a semiconductor device comprises a substrate stack that has two permanently bonded semiconductor bodies, which are stacked in a depth direction that points perpendicularly from a front side towards a back side of the substrate stack, and which share a buried bonding interface that extends at a respective distance from the front side and the back side and substantially parallel thereto.

A first of the two semiconductor bodies, hereinafter the protection body, comprises an active region with one or more light emitters at the buried bonding interface, and a light absorption region, which follows the active region in the depth direction and is opaque for light emitted from the one or more light emitters.

A second of the two semiconductor bodies, hereinafter the circuit body, extends from the buried bonding interface to the front side of the substrate stack, is transmissive for the light emitted from the one or more light emitters, and comprises at least one light detector at the front side of the substrate stack, which is configured to provide a detector signal indicative of a detected light intensity of light emitted from the one or more light emitters and transmitted through the circuit body.

The semiconductor device further comprises a driver unit that is configured to drive operation of the light emitters using predetermined operation parameters.

In the semiconductor device of the present invention, the substrate stack has a protection body that is permanently, i.e., irreversibly bonded to a circuit body.

In operation of the semiconductor device, a back side attack against the semiconductor device will modify an intensity of light detected by the one or more light detectors at the front side of the substrate stack in comparison with a light intensity detected in absence of an attack performed against the semiconductor device. This modification of intensity may have different causes, one of which is damage to the light emitters or to an electronic connection between the light emitters and the driver unit caused by the attack. Another possible cause that is detectable by the semiconductor device is a modification of the scattering properties of the buried bonding interface or of the circuit body along the propagation path from the light emitter(s) to the light detector(s) by the back side attack. Thus, a structural modification affecting the bonding interface will be detectable. Moreover, additional light intensity may be transmitted through the circuit body to at least one of the light detectors due to an opening in the substrate stack applied from back side in the course of an attack. Any such change of detected light intensity is detectable in the detector signal and can be used as an indication of an attack.

It is noted that a change in detected light intensity may also be detected by the semiconductor device in the course of side channel attacks performed from the front side of the semiconductor device, thus providing additional protection. However, irrespective of that, the disclosed protection solution is particularly reliable in detecting side-channel attacks performed via the back side of the substrate stack.

The semiconductor device can be used for a wide range of applications such as in smartcards, car electronics, electronic banking, military equipment, and communication terminals It is a particular advantage of the semiconductor device that it can provide a protection of the back side against attacks which can be performed using an optical technique through the back side of the semiconductor device but without tampering with or harming the semiconductor device.

In the following, embodiments of the semiconductor device will be described.

The protection body may comprise a metal layer for enhancing the light absorption properties of the protection body.

The light absorption region of the protection body is preferably configured to prevent light from leaving as well as entering the protection body via the back side of the substrate stack.

Preferably, the light absorption region is made of a material that absorbs light emitted from the light emitters. In one variant, the absorption extends also to a spectral range of light emitters provided in an integrated circuit on the front side of the semiconductor device as well as external light to which the semiconductor device is exposed. In particular, light absorption region is made of a material that absorbs visible light and infrared light.

In suitable implementations, the light absorption region of the protection body is made of a highly doped semiconductor material, e.g., highly doped silicon. Preferably, the absorption region is doped silicon region with a dopant concentration higher than $10^{19}$ cm$^{-3}$. Since light absorbed by the absorption region follows an exponential function in dependence on the thickness of the absorption region, the thickness of the absorption region is a further parameter for determining the required doping concentration. Thus, the thicker the absorption region the lower the doping concentration can be.

The spectral range of absorption is increased towards lower energies by high doping because the doping decreases the band gap of the semiconductor material of the protection body. It is per se known that the band gap and, thus, the wavelength dependence of the absorption of a semiconductor material such as silicon depends on a dopant concentration, and that the band gap shifts towards lower energies and may even vanish completely with increasing dopant concentration.

In some embodiments, at least the absorption region of the protection substrate is made of a compound semiconductor such as a III-V compound semiconductor as GaAs, InAs, GaN, InGaAs or InN, GaN or InGaN, or of a II-VI compound semiconductor such as oxides or selenides.

The active region can be made of the same material as the absorption region. In this case, it is particularly preferred that active region and absorption region are doped differently. Alternatively, active region and absorption region can be made of different materials. For example, the absorption region can be made of highly doped bulk silicon and the active region can be made of SiGe. It is also possible that the active region is made of SiGe and the absorption region is made of a compound semiconductor such as a III-V compound semiconductor, e.g., GaAs or InP.

The light emitters are arranged at the buried bonding interface. In operation of the semiconductor device, photons emitted by the one or more light emitters are absorbed in the light absorption region of the protection body, which prevents optical side channel attacks through the back side, and further avoids detectability of the presence of the protection provided in the semiconductor device from the back side. However, the light emitted by the light emitters at the bonding interface will be transmitted across the bonding interface and through the circuit body.

Preferably, an electrical connection between the driver unit and the at least one light emitter comprises one or more trough-substrate vias extending from the front side of the substrate stack through the circuit body to a contact structure on the protection body, which is in electrical contact with the at least one light emitter.

The one or more light emitters are configured to emit light at a wavelength or at a wavelength range for which the light detector is responsive. Preferably, the at least one light detector comprises an active light detector region, which is formed by a p-n junction of an electronic or optoelectronic component arranged on the circuit body. The at least one light detector can comprises a single p-n junction, a p-n junction of a transistor or a P-I-N junction as the active light detector region.

Different embodiments have different numbers of light detectors, starting from just one light detector, or ten light detectors, and including variant, which comprise more than one hundred light detectors distributed over the circuit body on the semiconductor device's front side.

Suitably, at least some of the components comprising the p-n junction are dedicated light-detectors configured and connected to perform only a light-detection function. Optionally, at least some of the components comprising the p-n junction are non-dedicated light detectors configured and connected to additionally perform an electronic function that is different from the light-detection function.

In some embodiments, the circuit body comprises a plurality of light detectors distributed within a dedicated light detection area. To increase protection, the light detectors are distributed over the whole lateral extension at the front side of the circuit body of the semiconductor device. They may be provided integrated into IC circuits that additionally perform other functions, such as signal or data processing, or signal communication.

The at least one light detector can be a detector that is only used for detecting light emitted from the light emitters, i.e., an optical detector. The light detector can alternatively be a detector that is used for detecting light emitted from the light emitters and as an electronic component of an integrated circuit arranged on the semiconductor device's front side.

By evaluating the detector signal, a modification or missing of the detector signal can be identified. It is preferred that the semiconductor device further comprises an evaluation unit that is configured to store expected-signal information indicative of a detector signal to be expected under operation of the light emitters using the predetermined operation parameters, and that is configured to receive the detector signal from the at least one light detector and is configured to compare the received detector signal with the expected-signal information, and to provide an evaluation signal indicative of a result of the comparison. The evaluation signal can thus be used as an indicator of an attack on the device integrity. It can for example be indicative of a modification or missing of the expected detector signal.

The expected-signal information is in one embodiment an encrypted representation of the expected signal. The expected-signal information can for instance be stored in the form of a hash function.

In particular, the evaluation unit is operatively connected to the at least one light detector for receiving detector signals from the light detector. The evaluation unit can be implemented on the front side of the semiconductor device, i.e., integrated on-chip. Alternatively, the evaluation unit can be an external element (off-chip) in wired or wireless connection to the semiconductor device. It may be provided in one and the same IC package with the semiconductor device or as a separate package on a circuit board shared with the semiconductor device.

The semiconductor device with or without an evaluation unit can further comprise a configuration unit, which is configured to drive operation of the driver unit, or the evaluation unit, or the driver unit and the evaluation unit in a configuration mode, preferably upon a first startup of the semiconductor device after its fabrication. It is also possible that the configuration unit is configured to drive operation of the driver unit, or the evaluation unit, or the driver unit and the evaluation unit in a configuration mode more than one time, e.g., repeatedly in predefined time intervals.

Preferably, the configuration unit is configured
to set the predetermined operation parameters; and
to receive and store the detector signal provided by the at least one light detector as the expected-signal information.

In particular, if the configuration unit is configured to only drive operation of the driver unit, or the evaluation unit, or the driver unit and the evaluation unit in a configuration mode upon a first startup of the semiconductor device after its fabrication, it can be beneficial that the semiconductor device is further configured to destroy the configuration unit after having driven operation of the driver unit, or the evaluation unit, or the driver unit and the evaluation unit in a configuration mode. For example, the semiconductor device can be configured to burn circuit elements the configuration unit or connections to the configuration unit after the configuration unit having finished its configuration mode, using a heating element or a suitably high current density. Thereby, the security of the semiconductor device can be enhanced.

Preferably, at least one of the driver unit, the evaluation unit and the configuration unit is provided as an integrated circuit on the circuit body.

In preferred embodiments, the buried bonding interface advantageously has an irregular three-dimensional shape that is configured to scatter the light emitted from the one or more light emitters in directions deviating from an unperturbed path of light propagation from the respective light emitter.

Thereby, a specific unique identifier can be implemented for the semiconductor device. Here a physical unclonable function (PUF) is realized by the manufacturing and wafer bonding variations resulting in a rough interface between circuit body and protection body. More specifically, due to the surface roughness at the interface of the protection body and the circuit body, in operation of the semiconductor device there is an unpredictable refraction of the emitted photons coming from the protection body's light emitters. Consequently, the photon signals that are detected in the at least light detector at the front side of the semiconductor device generate a unique fingerprint that is related to the surface roughness.

In preferred embodiments, the circuit body and the protection body are made of silicon. However, the at least one light-emitting device is in some embodiments made of a semiconductor material having a bandgap energy smaller than the bandgap energy of the semiconductor material of the circuit body. In some embodiments, however, the semiconductor material of the light emitter has a bandgap energy larger than the bandgap energy of the semiconductor material of the circuit body. In this case, the use of direct-bandgap material is preferred to achieve a high intensity that is sufficient to reach the light detector.

A suitable semiconductor material that the at least one light-emitting device can be made of is Si, SiGe, InP, GaN or GaAs. The material for the light emitters can be grown by epitaxy, e.g., by molecular beam epitaxy or metalorganic vapour phase epitaxy. Therefore, the material of the light emitters can be chosen relatively flexible. However, as a simple alternative, the light emitters can be fabricated by doping directly in the protection body material.

It is possible that the light emitters and the light detectors are made of the same material, e.g., SiGe. It is also possible that the light emitters and light detectors are made of different materials. In general, the light detectors will be made of Si and the light emitters are made of one of Si, SiGe, InP, GaN or GaAs.

The invention also includes a method for operating the semiconductor device of the present invention:
providing a semiconductor device of the present invention,
setting operation parameters to be used by the driver unit in driving operation of the light emitters;
operating the driver unit to drive operation of the light emitters using the set operation parameters;
detecting light emitted from the light emitters with the at least one light detector; and
providing a detector signal indicative of a detected light intensity of light emitted from the one or more light emitters and transmitted through the circuit body.

The method for operating the semiconductor device can further comprise the steps of
providing a semiconductor device according to the present invention which comprises an evaluation unit,
storing expected-signal information indicative of the detector signal to be expected under operation of the light emitters using the set operation parameters;
operating the evaluation unit to receive the detector signal indicative of the detected light intensity of light emitted from the one or more light emitters and transmitted through the circuit body; and
operating the evaluation unit to compare the received detector signal with the expected-signal information and to provide an evaluation signal indicative of a result of the comparison.

The method for operating the semiconductor device having an evaluation unit can further comprise the step of
upon provision of an evaluation signal that is indicative of a significant deviation of the received detector signal from the expected-signal information, operating the evaluation unit to generate and provide a warning signal indicative of a detected optical side channel attack via the back side of substrate.

The present invention further includes a method of fabricating the semiconductor device of the present invention, the method comprising
fabricating a first semiconductor wafer, hereinafter the protection wafer, the protection wafer comprising an active region with one or more light emitters arranged at a bonding surface of the protection wafer, and comprising a light absorption region, which follows the active region in a depth direction and is opaque at least for light emitted from the one or more light emitters;
providing a second semiconductor wafer, hereinafter the circuit wafer, which is transmissive for the light emitted from the one or more light emitters and comprises at least one light detector at the front side of the substrate stack, wherein the at least one light detector is configured to provide a detector signal indicative of a detected light intensity of light emitted from the one or more light emitters and transmitted through the circuit body;
performing a permanent bonding process to bond the protection wafer with its bonding surface to the circuit wafer, to produce a wafer stack comprising two permanently bonded semiconductor wafers, which are stacked in the depth direction that points perpendicularly from a front side towards a back side of the wafer stack, and which share a buried bonding interface that extends at a respective distance from the front side and the back side and substantially parallel thereto.

As a result of the method of fabricating the semiconductor device, the protection wafer is irreversibly bonded to the circuit wafer. This concept enables a large-scale implementation of the protection mechanism within an industrial fabrication environment. From the wafer stack, the semiconductor device of the present invention can be isolated, e.g., by cutting.

Figure 2:
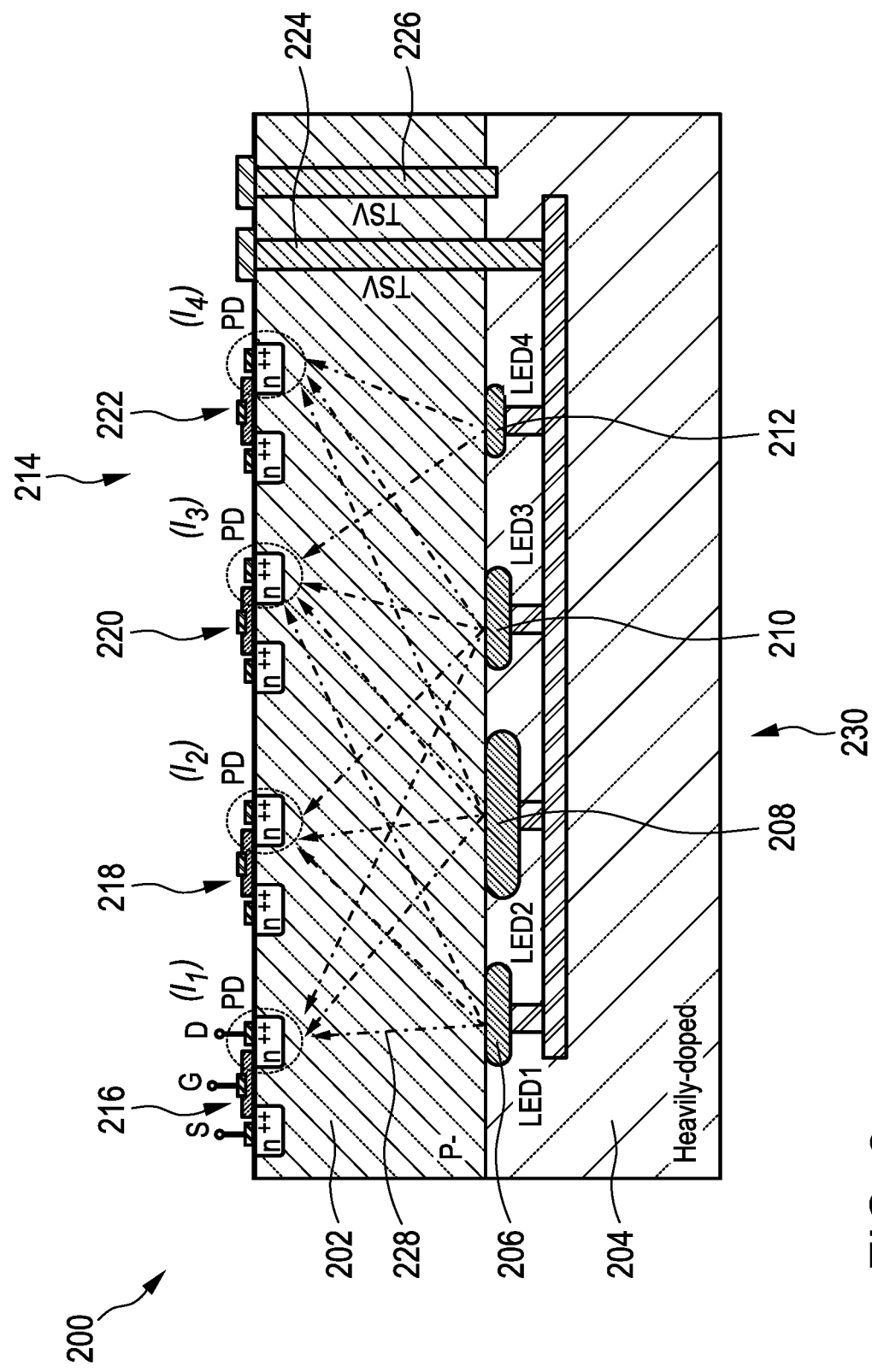
Figure 3:
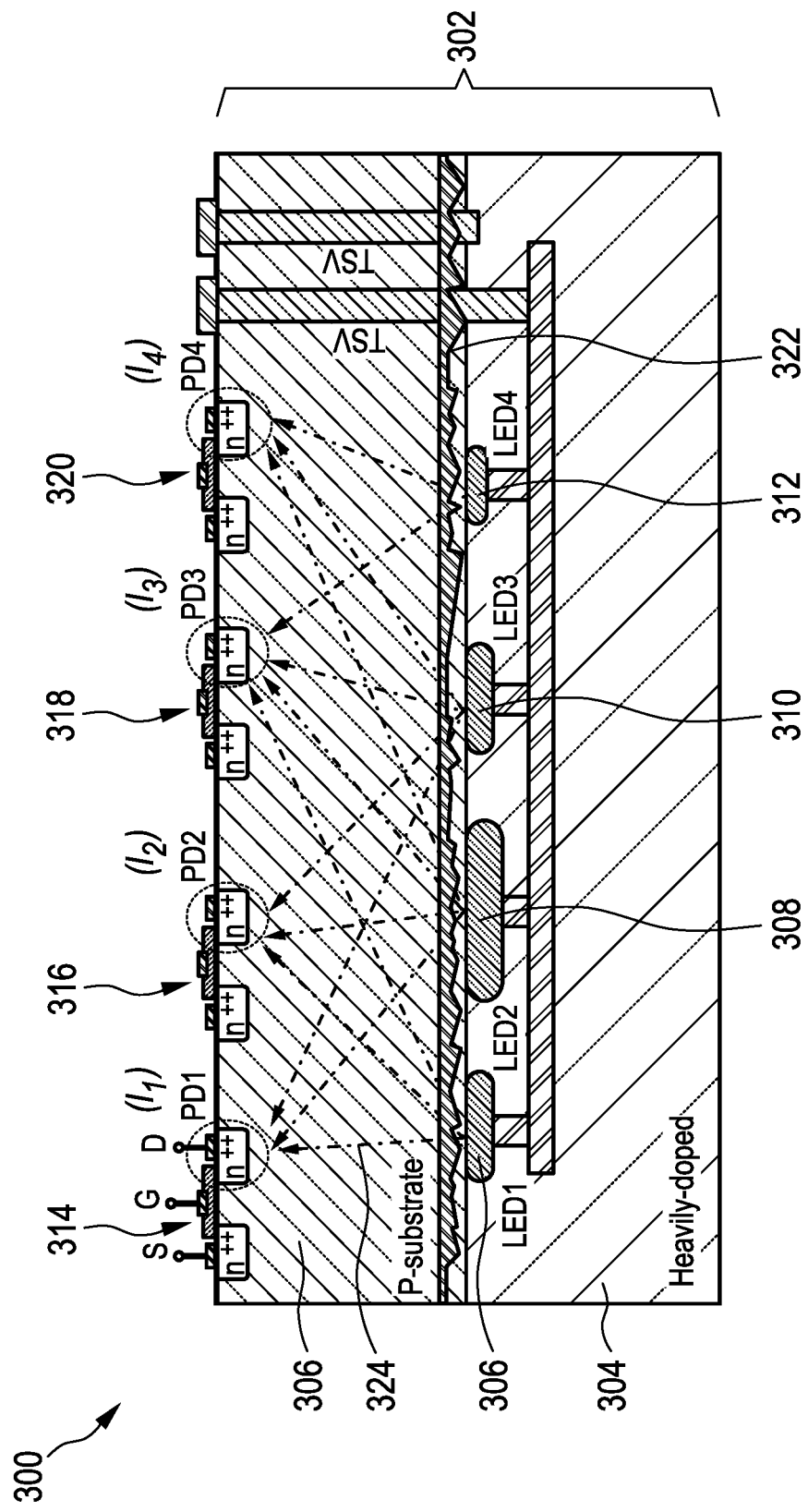

In the following, preferred embodiments of the invention are described with respect to the figures. In the figures:

FIG. 1: schematically shows a semiconductor device with back side protection mechanism implemented by a protection body comprising a light absorption region and an active region;

FIG. 2: schematically shows a semiconductor device that has multiple light emitters and multiple light detectors to generate a fingerprint of the integrated circuit arranged on the front side of the semiconductor device;

FIG. 3: schematically shows a semiconductor device that has multiple light emitters and multiple light detectors, wherein the buried bonding interface has an irregular three-dimensional shape that unpredictably scatters light emitted from the light emitters to generate a physical unclonable function.

FIG. 1 schematically depicts a semiconductor device 100, comprising a circuit body 102 and a permanently bonded protection body 104. Circuit body 102 and protection body 104 share a buried bonding interface 106 that extends at a respective distance from the front side 108 and the back side 110 of the semiconductor device 100. The circuit body 102 is made of silicon.

The protection body 104 comprises an active region 113 with a light emitter 112. The light emitter 112 is arranged directly at the buried bonding interface 106. The active region 113 can, e.g. be made of SiGe. The light emitter 112 can, e.g., be made of Si, SiGe, InP, GaN or GaAs. In alternative embodiments, the semiconductor device 100 comprises more than one light emitter.

The protection body 104 further comprises a light absorption region 114 that is made of highly doped bulk silicon. For example, the bulk silicon can be doped with a dopant concentration of $10^{19}$ cm$^{-3}$. Alternatively, the light absorption region can be made of a compound semiconductor material such as GaAs. The light absorption region 114 is opaque for light 116 emitted from the light emitter 112 and opaque to ambient light such that from the back side 110 no light enters the substrate stack 122 comprising protection body 104 and circuit body 102.

In operation of the semiconductor device 100, the light emitter 112 emits light 116 that is absorbed in the light absorption region and transmitted through the circuit body 102. On the front side 108 of the semiconductor device 100, light detectors 118 and 120 are arranged on the circuit body 102. The light detectors 118 and 120 are sensitive for the wavelength of the light 116 emitted by the light emitter 112 and configured to detect light transmitted through the circuit body 102. The light detector 120 is a p-n junction. Both light detectors 118, 120 are configured to provide a detector signal indicative of a detected light intensity of light 116 emitted from the light emitter 112 and transmitted through the circuit body 102.

The semiconductor device 100 further comprises a driver unit (not shown) that is configured to drive operation of the light emitter 112 using predetermined operation parameters.

The semiconductor device 100 can further comprise an evaluation unit that is configured to store expected-signal information indicative of a detector signal to be expected under operation of the light emitters using the predetermined operation parameters, and that is configured to receive the detector signal from the light detector 118, 120 and is configured to compare the received detector signal with the expected-signal information, and to provide an evaluation signal indicative of a result of the comparison. For example, from the comparison it is possible to find a modification or missing of the photon signal emitted by the light emitter 112. Thereby, it is possible to detect an optical or physical attack from the back side of the semiconductor device 100.

The semiconductor device 100 further comprises a contact structure 124 for electrically contacting the driver unit (not shown) and the light emitter 112 further employing a through-silicon-via (TSV) 126 extending from the front side 108 of the substrate stack 122 through the circuit body 102. The light emitter 112 is also in electrical contact with the active region 113.

The highly doped bulk of the protection body's light absorption region 114 in combination with the large available bulk volume offers a low ohmic resistance. This available current path is used to contact one region of the light emitter 112 within the protection body 104. This advance is beneficial as a manipulation of the protection body 104 would result in an increase of the resistance of this current path which than result in a change of the photon emission intensity of the light emitter 112. This change in intensity can be detected in the front end of the circuit body 102, i.e., by the light detectors 118 and 120. A minimalistic metal wiring can be used as contact structure 124 to connect the light emitter 112.

Using a further TSV 128, light the absorption region 114 is electrically contacted by means of another contact structure 130 with an electronic circuit arranged on circuit body 102 on the front side 108 of the semiconductor device 100.

The highly doped light absorption region is used as a base for the protection body 104. The absorption region 114 prevents optical signals (light 116 emitted from the light emitter 112 and ambient light) from passing the protection body 104. It is preferred that the protection body 104 comprises an active region 113 consisting of SiGe to realize p-n-junctions with a bandgap below the bandgap of silicon. These indirect junctions offer a low quantum efficiency but can pass the bulk silicon of the circuit body 102 and can be detected, e.g., by reverse biased p-n-junctions serving as light detectors 120 arranged on the circuit body 102.

FIG. 2 schematically shows a semiconductor device 200 that has a circuit body 202 and a protection body 204. At the buried interface, number of light emitters 206, 208, 210, 212 (all LEDs) are arranged to emit light through the circuit body 202. The circuit body 202 is transmissive for the emitted light whereas the protection body 204 comprises a light abruption region in which emitted light gets absorbed.

On the front side 214 of the semiconductor device 200, light detectors 216, 218, 220, 222 are arranged on the circuit body 202. The light detectors 216, 218, 220, 222 are implemented as junctions of a transistor. The light emitters 206, 208, 210, 212 and the protection body are electrically contacted using TSV's 224 and 226.

In operation, light 228 emitted by the light emitters 206, 208, 210, 212 is prevented from entering or leaving the semiconductor device 200 through the back side while actively monitoring the integrity of the protection mechanism and simultaneously provide a unique chip identifier.

A large flexibility of arranging electronic components on the circuit body is achieved, since the protection mechanism is outsourced to the protection body 204. The protection body 204 is not limited by material contaminations or process parameters from the circuit body 202. This gives the flexibility to use e.g. III-V materials or apply high temperatures for epitaxial growth for fabricating the protection body 204. Preferably, the circuit body 202 is made of silicon.

FIG. 3 shows a semiconductor device 300 having a substrate stack 302 comprising a protection body 304 preferably made of heavily doped silicon and a circuit body 306. The semiconductor device 300 is configured as described with respect to FIG. 2 and, thus, comprises light emitters 308, 310, 312, 314 arranged at the buried interface, and light detectors 314, 316, 318, 320 arranged on the circuit body 306.

Additionally, the buried bonding interface 322 has an irregular three-dimensional shape that is configured to scatter the light 324 emitted from the light emitters 308, 310, 312, 314 in directions deviating from an unperturbed path of light propagation from the respective light emitter 308, 310, 312, 314. Thus, the light 322 is unpredictably scattered at the buried bonding interface 322.

Thereby a physical unclonable function (unique identifier) can be implemented.

An important security relevant feature is the implementation of chip specific unique identifier. Here a physical unclonable function is realized by the manufacturing and wafer bonding variations. More specifically: due to the surface roughness of the buried bonding interface 322 there is a unpredictable refraction of the light 324 coming from the light emitters 308, 310, 312, 314. Consequently, the photon signals that are detected in the light detectors 314, 316, 318, 320 in the frontend of the circuit body generate a unique fingerprint that is related to the surface roughness 322.

What is claimed is:

1. A semiconductor device, comprising:
   a substrate stack comprising two permanently bonded semiconductor bodies, which are stacked in a depth direction that points perpendicularly from a front side towards a back side of the substrate stack, and which share a buried bonding interface that extends at a respective distance from the front side and the back side and substantially parallel thereto,
   wherein a first of the two semiconductor bodies, hereinafter a protection body, comprises an active region with one or more light emitters at the buried bonding interface, and a light absorption region, which follows the active region in the depth direction and is opaque for light emitted from the one or more light emitters;
   wherein a second of the two semiconductor bodies, hereinafter a circuit body, extends from the buried bonding interface to the front side of the substrate stack, is transmissive for the light emitted from the one or more light emitters, and comprises at least one light detector at the front side of the substrate stack, which is configured to provide a detector signal indicative of a detected light intensity of light emitted from the one or more light emitters and transmitted through the circuit body; and
   wherein the semiconductor device further comprises a driver unit that is configured to drive operation of the light emitters using predetermined operation parameters.

2. The semiconductor device of claim 1, further comprising an evaluation unit that is configured to store expected-signal information indicative of a detector signal to be expected under operation of the one or more light emitters using the predetermined operation parameters, and that is configured to receive the detector signal from the at least one light detector, and that is configured to compare the received detector signal with the expected-signal information, and to provide an evaluation signal indicative of a result of the comparison.

3. The semiconductor device of claim 1, wherein an electrical connection between the driver unit and the one or more light emitters comprises one or more trough-substrate vias extending from the front side of the substrate stack through the circuit body to a contact structure on the protection body, which is in electrical contact with the one or more light emitters.

4. The semiconductor device of claim 2, further comprising:
   a configuration unit, which is configured to drive operation of the driver unit, or the evaluation unit, or the driver unit and the evaluation unit in a configuration mode, upon a first startup of the semiconductor device after the semiconductor device has been fabricated and which is configured:
   to set the predetermined operation parameters; and
   to receive and store the detector signal provided by the at least one light detector as the expected-signal information.

5. The semiconductor device of claim 4, wherein at least one of the driver unit, the evaluation unit and the configuration unit is provided as an integrated circuit on the circuit body.

6. The semiconductor device of claim 1, wherein the buried bonding interface has an irregular three-dimensional shape that is configured to scatter the light emitted from the one or more light emitters in directions deviating from an unperturbed path of light propagation from a respective light emitter of the one or more light emitters.

7. The semiconductor device of claim 1, wherein the at least one light detector comprises an active light detector region, which is formed by a p-n junction of a component arranged on the circuit body.

8. The semiconductor device of claim 7, wherein the component comprising the p-n junction is a dedicated light detector which is configured and connected to perform only a light-detection function.

9. The semiconductor device of claim 7, wherein the electronic component comprising the p-n junction is a non-dedicated light detector which is configured and connected to additionally perform an electronic function that is different from the light-detection function.

10. The semiconductor device of claim 1, wherein the circuit body and the protection body are made of silicon.

11. The semiconductor device of claim 1, wherein the one or more light emitters is made of Si, SiGe, InP, GaN or GaAs.

12. A method for operating a semiconductor device, comprising:
   providing a semiconductor device of claim 1;
   setting operation parameters to be used by the driver unit in driving operation of the one or more light emitters;
   operating the driver unit to drive operation of the light emitters using the set operation parameters;
   detecting light emitted from the light emitters with the at least one light detector; and
   providing the detector signal indicative of the detected light intensity of the light emitted from the one or more light emitters and transmitted through the circuit body.

13. The method of claim 12, wherein the semiconductor device further comprises an evaluation unit that is configured to store expected-signal information indicative of a detector signal to be expected under operation of the one or more light emitters using the predetermined operation parameters, and that is configured to receive the detector signal from the at least one light detector, and that is configured to compare the received detector signal with the expected-signal information, and to provide an evaluation signal indicative of a result of the comparison, and wherein the method further comprises:

storing the expected-signal information indicative of the detector signal to be expected under operation of the one or more light emitters using the set operation parameters;

operating the evaluation unit to receive the detector signal indicative of the detected light intensity of light emitted from the one or more light emitters and transmitted through the circuit body; and operating the evaluation unit to compare the received detector signal with the expected-signal information and to provide the evaluation signal indicative of the result of the comparison.

14. The method of claim 13, further comprising upon provision of an evaluation signal that is indicative of a significant deviation of the received detector signal from the expected-signal information, operating the evaluation unit to generate and provide a warning signal indicative of a detected optical side channel attack via the back side of the substrate stack.

15. A method of fabricating the semiconductor device of claim 1, comprising:

fabricating the protection body comprising the active region with the one or more light emitters arranged at a bonding surface of the protection body, and comprising the light absorption region, which follows the active region in the depth direction and is opaque at least for light emitted from the one or more light emitters;

providing the circuit body, which is transmissive for the light emitted from the one or more light emitters and comprises the at least one light detector at the front side of the substrate stack, wherein the at least one light detector is configured to provide the detector signal indicative of the detected light intensity of light emitted from the one or more light emitters and transmitted through the circuit body; and performing a permanent bonding process to bond the protection body with the bonding surface to the circuit body, to produce the substrate stack comprising the two permanently bonded semiconductor bodies, which are stacked in the depth direction that points perpendicularly from the front side towards the back side of the substrate stack, and which share the buried bonding interface that extends at the respective distance from the front side and the back side of the substrate stack and substantially parallel thereto.

* * * * *

UNITED STATES PATENT AND TRADEMARK OFFICE
CERTIFICATE OF CORRECTION

PATENT NO. : 12,394,770 B2
APPLICATION NO. : 18/559076
DATED : August 19, 2025
INVENTOR(S) : Norbert Herfurth et al.

It is certified that error appears in the above-identified patent and that said Letters Patent is hereby corrected as shown below:

In the Claims

Column 9, Lines 33-60 should read:
1. A semiconductor device, comprising:
a substrate stack comprising two permanently bonded semiconductor bodies, which are stacked in a depth direction that points perpendicularly from a front side towards a back side of the substrate stack, and which share a buried bonding interface that extends at a respective distance from the front side and the back side and substantially parallel thereto,
wherein a first of the two semiconductor bodies, hereinafter a protection body, comprises an active region with one or more light emitters at the buried bonding interface, and a light absorption region, which follows the active region in the depth direction and is opaque for light emitted from the one or more light emitters,
wherein a second of the two semiconductor bodies, hereinafter a circuit body, extends from the buried bonding interface to the front side of the substrate stack, is transmissive for the light emitted from the one or more light emitters, and comprises at least one light detector at the front side of the substrate stack, which is configured to provide a detector signal indicative of a detected light intensity of the light emitted from the one or more light emitters and transmitted through the circuit body; and
wherein the semiconductor device further comprises a driver unit that is configured to drive operation of the one or more light emitters using predetermined operation parameters.

Column 10, Lines 41-45 should read:
9. The semiconductor device of claim 7, wherein the component comprising the p-n junction is a non-dedicated light detector which is configured and connected to perform an electronic function that is different from a light-detection function.

Column 10, Lines 51-62 should read:
12. A method for operating a semiconductor device, comprising:
providing the semiconductor device of claim 1;
setting operation parameters to be used by the driver unit in driving operation of the one or more light emitters;

Signed and Sealed this
Fourteenth Day of October, 2025

John A. Squires
*Director of the United States Patent and Trademark Office*

CERTIFICATE OF CORRECTION (continued)
U.S. Pat. No. 12,394,770 B2 operating the driver unit to drive operation of the one or more light emitters using the set operation parameters;
detecting the light emitted from the one or more light emitters with the at least one light detector; and
providing the detector signal indicative of the detected light intensity of the light emitted from the one or more light emitters and transmitted through the circuit body.

Column 10, Lines 63-Column 11, Line 18 should read:
13. The method of claim 12, wherein the semiconductor device further comprises an evaluation unit that is configured to store expected-signal information indicative of a detector signal to be expected under operation of the one or more light emitters using the predetermined operation parameters, and that is configured to receive the detector signal from the at least one light detector, and that is configured to compare the received detector signal with the expected-signal information, and to provide an evaluation signal indicative of a result of the comparison, and wherein the method further comprises:
storing the expected-signal information indicative of the detector signal to be expected under operation of the one or more light emitters using the set operation parameters;
operating the evaluation unit to receive the detector signal indicative of the detected light intensity of the light emitted from the one or more light emitters and transmitted through the circuit body; and
operating the evaluation unit to compare the received detector signal with the expected-signal information and to provide the evaluation signal indicative of the result of the comparison.

Column 11, Lines 26-Column 12, Line 26 should read:
15. A method of fabricating the semiconductor device of claim 1, comprising:
fabricating the protection body comprising the active region with the one or more light emitters arranged at a bonding surface of the protection body, and comprising the light absorption region, which follows the active region in the depth direction and is opaque at least for the light emitted from the one or more light emitters;
providing the circuit body, which is transmissive for the light emitted from the one or more light emitters and comprises the at least one light detector at the front side of the substrate stack, wherein the at least one light detector is configured to provide the detector signal indicative of the detected light intensity of the light emitted from the one or more light emitters and transmitted through the circuit body; and
performing a permanent bonding process to bond the protection body with the bonding surface to the circuit body, to produce the substrate stack comprising the two permanently bonded semiconductor bodies, which are stacked in the depth direction that points perpendicularly from the front side towards the back side of the substrate stack, and which share the buried bonding interface that extends at the respective distance from the front side and the back side of the substrate stack and substantially parallel thereto.